United States Patent

[11] 3,622,235

[72] Inventor Masayoshi Yamada
No. 2-36-2, Zempukuji, Suginami-ku, Tokyo-to, Japan
[21] Appl. No. 885,763
[22] Filed Dec. 17, 1969
[45] Patented Nov. 23, 1971

[54] FRAMING ADJUSTMENT DEVICE FOR USE IN PROJECTORS
3 Claims, 7 Drawing Figs.

[52] U.S. Cl. ................................................. 352/92
[51] Int. Cl. .......................................... G03b 21/50
[50] Field of Search ............................. 352/92, 236

[56] References Cited
UNITED STATES PATENTS
2,653,508  9/1953  Whiteley ..................... 352/92
3,184,177  5/1965  Hannah ....................... 352/92 UX Primary Examiner—Donald O. Woodiel
Attorney—Scrivener, Parker, Scrivener and Clarke ABSTRACT: A framing adjustment device wherein a framing mark upon film may be optically detected by a photoelectric transducer element so that when the picture is not correctly positioned, the film may be gradually advanced until the picture is correctly positioned, during each intermittent stop of a pulldown drive mechanism of the projector, by means of a motor which is automatically controlled by discriminator which detects a discrepancy between a proper frame position of projecting film and an aperture of the projector.

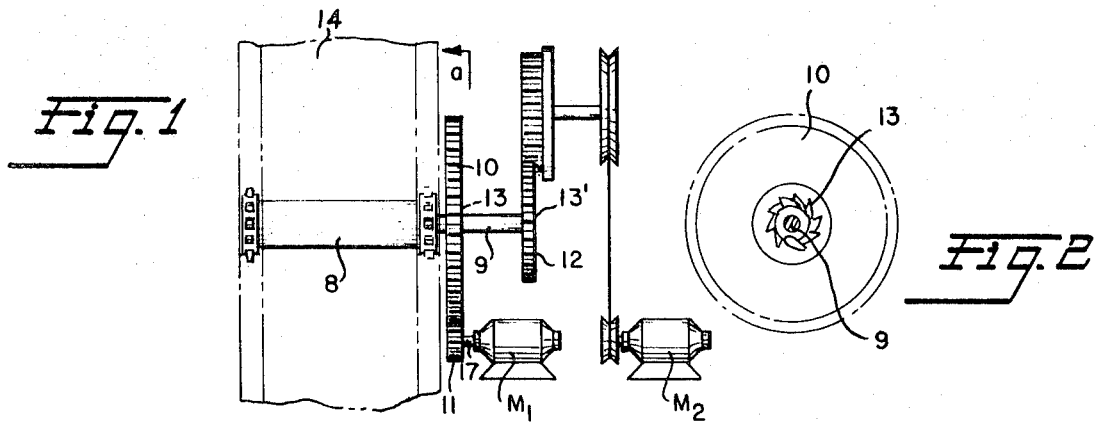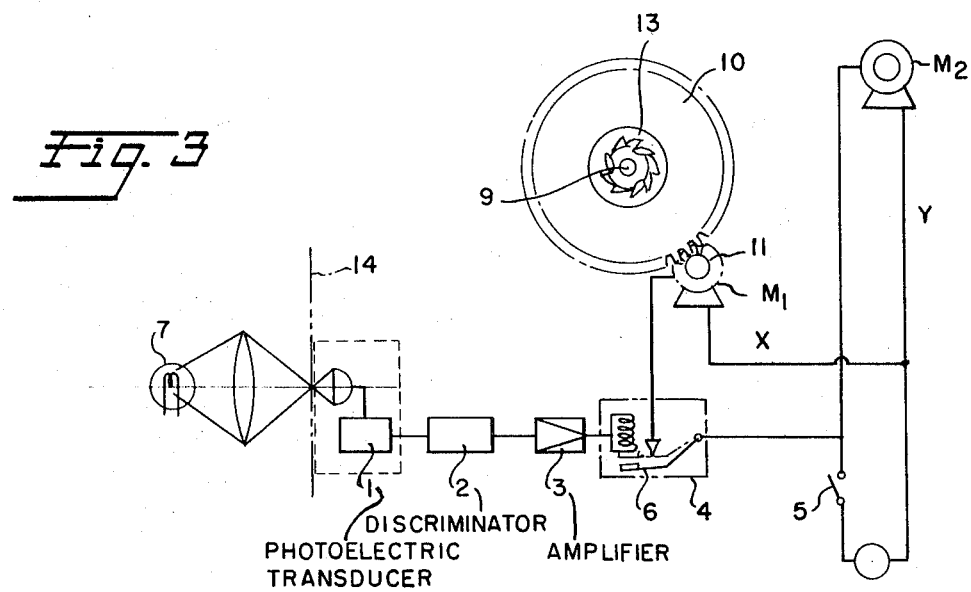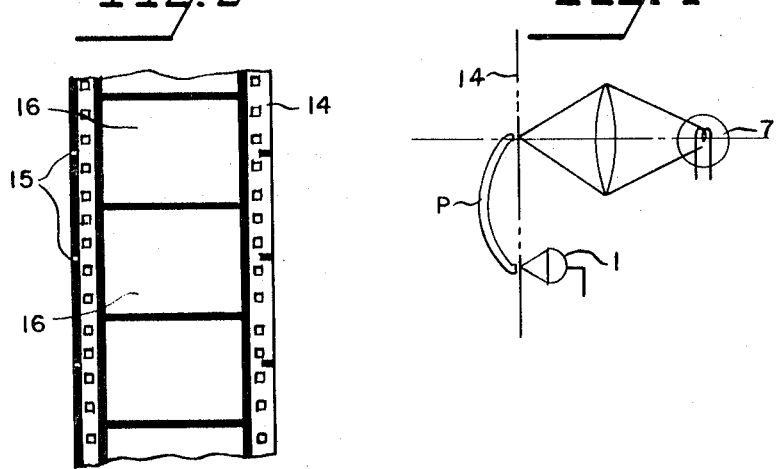

FRAMING ADJUSTMENT DEVICE FOR USE IN PROJECTORS

BACKGROUND OF THE INVENTION

The present invention relates to a framing adjustment device for use in projectors which can automatically position the picture correctly when the frames of the film are not correctly positioned relative to the aperture of the projector.

SUMMARY OF THE INVENTION

In brief, a framing adjustment device for use in projectors in accordance with the present invention is characterized in that a discriminator is mounted upon a projector in such a manner that said discriminator may discriminate the quantity of light incident upon photoelectric transducer element from a light source; said light passes through a mark marked upon one side of each of the frames of film and is made incident upon said photoelectric transducer element which is disposed in closely spaced-apart relation with said one side of said film; and an electric circuit of a framing device is provided which is closed or opened through said discriminator, whereby when said circuit is closed, a sprocket wheel of a pulldown mechanism of the projector may be driven by a motor in said circuit independently of the normal intermittent motion of said sprocket wheel for advancing said film.

According to the present invention, when the frames of the film are not correctly positioned relative to the aperture of the projector, they may be automatically positioned correctly relative to the aperture.

The above and other objects, features and advantages of the present invention will become more apparent from the following description of one embodiment thereof with reference to the accompanying drawing.

BRIEF DESCRIPTION OF THE DRAWINGS

FIG. 1 is a view for explanation of the principal components of the present invention;

FIG. 2 is a schematic side view of a large diameter gear looking in the direction indicated by the arrow *a* in FIG. 1;

FIG. 3 is a block diagram of one embodiment of a framing adjustment device in accordance with the present invention;

FIG. 6 is for explanation of marks upon film for framing adjustment; said

FIG. 7 is a schematic view illustrating one variation of the relative arrangement between the phototransducer element and a light source.

DESCRIPTION OF THE PREFERRED EMBODIMENT

Figure 4:
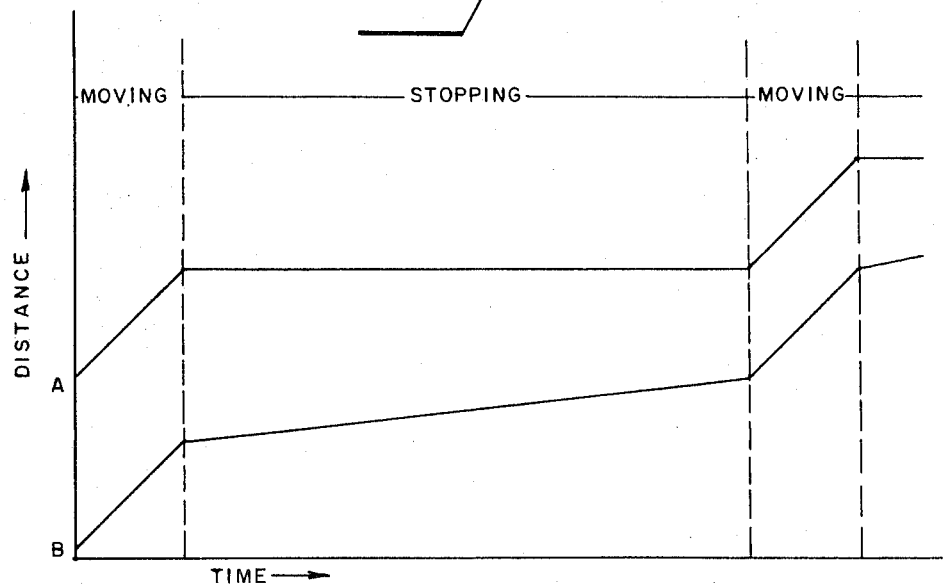
FIG. 4 is for explanation of the variation in film advancing speed.

As best shown in FIG. 6, each frame 16 of a film 14 is marked with a transparent portion 15 at the center of the left side of the film 14. The large quality of the light irradiated from a light source 7 may pass through the transparent portion 15 when the film 14 stopped, and the said light may not or scarcely pass through the said portion 15 when the portion 15 is not correctly positioned relative to the aperture of the projector.

Referring to FIG. 3, when a switch 5 is closed, an electric circuit of a framing device Y is closed so that the film 14 is normally intermittently advanced. A switch 6 of a relay 4 remains closed by a discriminator 2 so as to drive motor $M_1$ when the light from the light source 7 passes through for a very limited time so that the light quantity incident upon a photoelectric transducer element 1 is less, that is when each frame 16 is not correctly positioned relative to the aperture of the projector as will be described in more detail hereinafter. On the other hand, when a predetermined light quantity is incident upon a photoelectric transducer element 1, the switch 6 is opened so that motor $M_1$ is stopped. In other words, depending upon the light quantity incident closed or opened.

A large diameter toothed wheel 10 is carried through a unidirectional clutch 13 by a shaft 9 of a sprocket wheel 8 and is in mesh with a small diameter toothed wheel 11 carried by a shaft of the motor $M_1$. The sprocket wheel 8 is intermittently driven by the motor $M_2$ through a Maltese cross 12 which is carried at the end of the shaft 9 remote from the sprocket wheel 8 through a unidirectional clutch 13' similar in construction to the clutch 13. When the motor $M_2$ drives the Maltese cross 12, the clutch 13' connects it to the shaft 9 so that the sprocket wheel 8 is driven thereby intermittently advancing the film 14. Since the speed of rotation of the large diameter wheel 10 is less than that of the Maltese cross 12, the clutch 13 disconnects the large diameter wheel 10 from the shaft 9. But when the large diameter toothed wheel 10 is rotated by the cross motor $M_1$ and when the Maltese 12 which intermittently drives the shaft 9 is stopped, the clutch 13 may connect the large diameter toothed wheel 10 to the shaft 9 so that the sprocket wheel 8 is driven by the motor $M_1$ even when the Maltese cross 12 is disconnected from the shaft 9.

Figure 5:
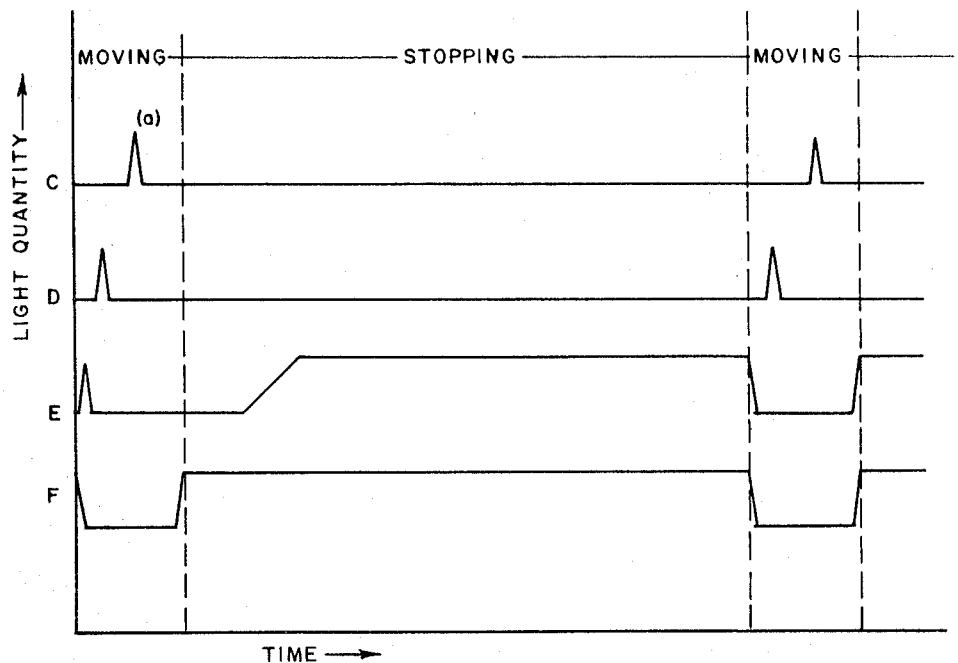
FIG. 5 is for explanation of the variation in light quantity of light incident upon a photoelectric transducer element of the device of the present invention.

As described hereinabove, the relay 4 and consequently the switch 6 remain closed by the discriminator 2 which is interposed between the photoelectric transducer element 1 and an amplifier 3 which amplifies the output of the discriminator 2 when the light quantity incident upon the photoelectric transducer element 1 is less than the predetermined value since the light from the light source 7 is permitted to pass through the transparent portion only when the film 14 is advanced. This is shown by a peak (*a*) in FIG. 5.

When the switch 5 is closed, the circuit Y is closed so that the motor $M_2$ is driven. The Maltese cross 13 engages with the shaft 9 so that the sprocket wheel 8 is driven, thereby advancing the film 14 intermittently. When the film 14 is advanced correctly so that the frames 16 thereof are correctly positioned relative to the aperture of the projector, the film 14 is advanced as shown by A in FIG. 4. When the film 14 is advanced correctly as described above, the light from the light source 7 is not permitted to pass through the transparent portions 15 during the intermittent advancement of the film 14 in the instant embodiment. But the light source 7 is so arranged that the light therefrom may pass through the transparent portions 15 during the intermittent stop of the film 14 when the film is correctly advanced. This is illustrated by the curve F in FIG. 5.

When the frames 16 of the film 14 are not positioned at correct position relative to the aperture of the projector upon the intermittent advancement of the film 14 so that the upper or lower side edges or lines of the frames are projected upon the screen, the light from the light source 7 is permitted to pass through the transparent portions 15 only for very limited time. In this case, as shown at (*a*) in FIG. 5, the light quantity incident upon the photoelectric transducer element 1 is much less and the discriminator 2 is not actuated so that the circuit X remains closed. Therefore, the motor $M_1$ remains driven and rotates the large diameter gear 10, which does not rotate relative to the shaft 9 when the latter is rotated. When the shaft 9 is stopped, the large diameter gear 10 engages with the shaft 9 so that the film 14 which is normally advanced intermittently by the motor $M_2$ is gradually advanced by the motor $M_1$ only when the film 14 is stopped intermittently through the Maltese cross 12. When the sprocket wheel 8 is driven by the motor $M_2$ through the Maltese cross 12, the film 14 is advanced again at a normal speed (See FIG. 4, B). Thus, the time when the transparent portion 15 of the film 14 passes in front of the light source 7 is deviated as shown by the peaks by F in FIG. 5 and the transparent portions 15 finally pass in front of the source 7 when the film 14 which is advanced by the motor $M_2$ is intermittently stopped. In this case, the photoelectric transducer element 1 receives a considerably large amount of light so that the discriminator is so actuated as to open the relay 4 through the amplifier 3. Therefore, the framing motor $M_1$ is stopped and the adjustment is accomplished so that the film 14 is intermittently stopped at correct projection position relative to the aperture of the projector. Thereafter, the film 14 is intermittently advanced in the normal manner.

In the instant invention, the marks upon the film 14 for frame adjustment have been described as being light transmitting or transparent portions 15. However, it will be understood that other marks such as black dotlike markings may be marked upon the film on the right side thereof as shown in FIG. 6. The light source 7 and the photoelectric transducer element 1 may be disposed on the same side relative to the film 14 as shown in FIG. 7. In this case, a suitable light transmission means P such as optical fibers may be disposed in such a manner that one end of the light transmission means P is opposed to the light source 7 while the other end to the photoelectric transducer element 1 and both ends of the light transmission means P are so spaced apart that when one end thereof opposes one framing adjustment mark, the other end oppose the adjacent mark. It is not necessary at all to position the frame adjustment mark at the center of one side of the film 14. The mark may be positioned at any position as needs demand. It is also understood that it is not necessary to mark the framing adjustment marks upon the film when the opaque boundary edges between the frames of the film are used as the framing adjustment marks. It is course understood that instead of the clutches 13 and 13' described above with reference to the accompanying drawing, any suitable mechanism such as rim drive mechanism having idlers may be employed.

It will be understood that other variations and modifications can be effected without departing from the true spirit of the present invention as defined in the appended claim.

What is claimed is:

1. A framing adjustment device for use in a film projector having an aperture for projecting frames of film comprising:

a. a rotating sprocket means 8, 9 for advancing and positioning said film;
   b. a first motor $m_2$;
   c. a first unidirectional clutch means 12 and 13' connecting the first motor with the sprocket means for intermittently rotating the sprocket means at a first speed thereby intermittently advancing the film a distance approximately equal to the distance between frames;
   d. a second motor $M_1$;
   e. a second unidirectional clutch means 11, 13 for connecting the second motor with the sprocket means when the film is not being advanced by the first motor for rotating the sprocket means in a direction to advance the film at a second speed slower than the first speed;
   f. means 15 for forming a framing mark on each frame;
   g. light means 7 for projecting a light beam onto a predetermined part of each frame such that the light beam will be intercepted by a framing mark as the film is advanced;
   h. photoelectric means 1 responsive to the presence of the framing mark within said projected light beams; and
   i. circuit means 2, 3, 4 electrically connected to the photoelectric means and responsive thereto for energizing the second motor unless the framing mark intercepts the light beam for at least a predetermined time whereby each frame can be precisely positioned with respect to the aperture of the projector.

2. A framing adjustment device as in claim 1 wherein the light means comprise a light source and light pipe P for transmitting the light from the light source to the predetermined part of each frame.

3. A framing adjustment device as in claim 1 wherein the framing mark comprises an opaque area on the film.

* * * * *